F. SHALLER.
Metal Drill.
No. 55,918.
Patented June 26, 1866.
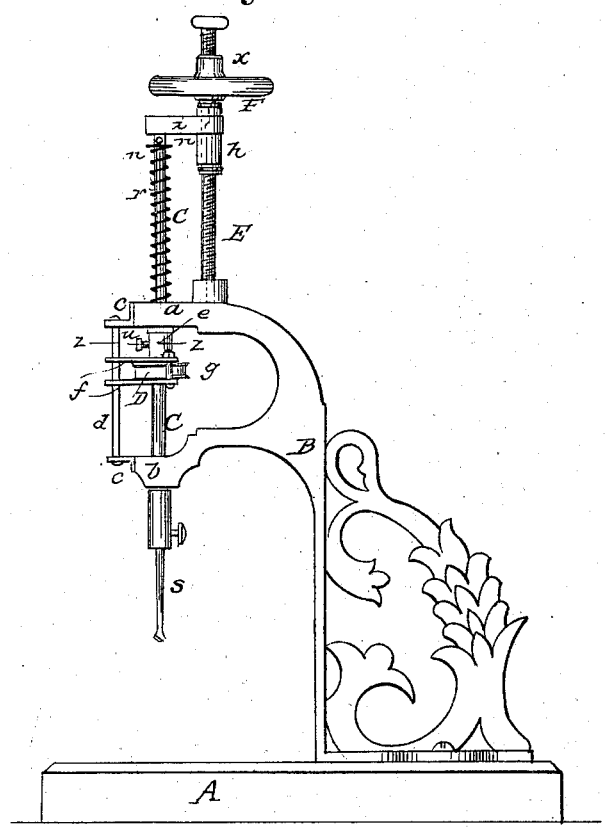
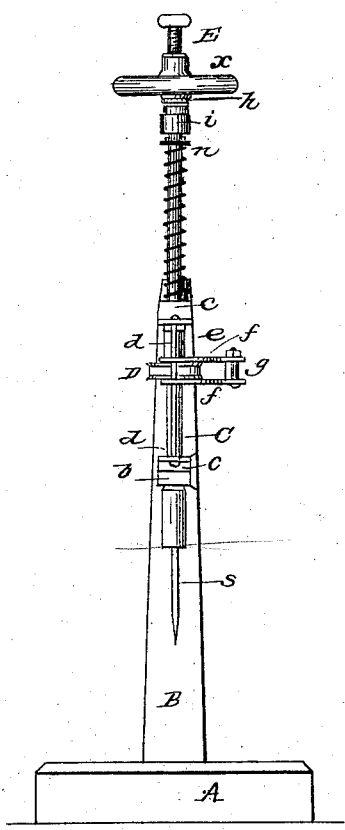
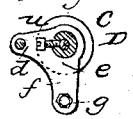
Witnesses
Inventor
Fred Shaller

UNITED STATES PATENT OFFICE.

FRIEDRICH SHALLER, OF HUDSON, NEW YORK.

IMPROVED DRILLING-MACHINE.

Specification forming part of Letters Patent No. 55,918, dated June 26, 1866.

*To all whom it may concern:*

Be it known that I, FRIEDRICH SHALLER, of Hudson, in the county of Columbia and State of New York, have invented a new and useful Improvement in Drilling-Machines; and I do hereby declare that the following is a full, clear, and exact description of the same, reference being had to the accompanying drawings, making a part of this specification, in which—

Figure 1 is a side elevation. Fig. 2 is a front elevation. Fig. 3 is a detached portion of the drill.

Similar letters of reference indicate corresponding parts in the several figures.

This invention consists in a novel arrangement of parts whereby the drilling-machine is rendered very simple, compact, and durable in construction, and whereby it may be very conveniently operated, and, furthermore, by which the drill-spindle and the appurtenances thereof may be readily removed from, or replaced in, their supporting-frame when desired.

To enable others to understand the construction and operation of my invention, I will proceed to describe it with reference to the drawings.

A is the base, and B is an upright frame, which is securely attached to the base and supports the working parts of the machine.

C is a vertical drill-spindle, which is placed in suitable bearings formed in the arms $a\ b$ of the frame B, near the outer ends thereof, and has a sliding as well as rotary movement therein, as will be presently explained. Fixed upon the extremities of the said arms $a\ b$ are two outwardly-projecting lugs or ears, $c$, which support an upright guide, $d$, which may be formed of a cylindrical iron rod.

D is the driving-pulley, the hub $e$ of which forms a cylindrical collar, by means of which it is rigidly fixed upon the drill-spindle C by a set-screw, $u$, and $f f$ are two flat plates situated, one upon the upper side of the pulley D and the other below it, the ends of the hub $e$ passing through circular holes of suitable size formed in the said plates. Each of these plates has two arms, as shown in Fig. 3, one of which has a horizontal hole formed in it, through which is passed the guide-rod $d$, while the other arms of the said plates $f f$ are united by a small vertical brace, $g$, so that the said plates $f f$ form a small frame through which the drill-spindle rotates and which moves up and down with the vertically-sliding movements of the same, and serves to keep the belt from running off the pulley D, as will be hereinafter more fully set forth.

E is a stationary vertical screw, the lower end of which is fixed in the top of the frame B. Placed in this screw E is a sliding collar, $h$, which has a horizontal bar, $i$, formed upon it, which projects forward over the upper end of the spindle C, the said upper end of the spindle C being made conical or pointed and fitted into a small recess or cavity formed in the under side of the bar $i$.

F is a hand-wheel, the hub $x$ of which has a female screw or nut formed in its interior, which is screwed upon the screw E above the collar $h$, so that by turning the said hand-wheel the collar $h$ may be forced downward or allowed to move upward thereon when desired.

Passing through the drill-spindle, near the upper end thereof, is a short pin, $m$, below which is placed a washer, $n$, and surrounding the drill-spindle, between this washer $n$ and the arm $a$, is a spiral spring, $r$, the upward pressure of which constantly tends to elevate the said drill-spindle and keeps the collar $h$ in contact with the under side of the hub $x$ of the hand-wheel F.

A running belt being passed around the pulley D, within the frame $f f$, and a suitable drill, $s$, being placed in a socket formed in the lower end of the spindle C, the operation of the invention is as follows: The article to be drilled is placed upon the base A under the drill $s$, and the hand-wheel is turned in one direction in such manner as to be moved downward upon the screw E and force the collar $h$, and consequently the drill-spindle C, downward also, the feeding of the drill $s$ to the work being thus accomplished, while by turning the hand-wheel in an opposite direction the spindle C is allowed to move upward by the action of the spiral spring $r$, and thus raise the drill $s$ away from the work, the plates which constitute the frame $f f$ preventing the belt from running off from the pulley D, and the said frame $f f$ being kept from turning around by the guide $d$, which also steadies it as it rises and falls with the vertical movements of the pulley D.

When it is desired to remove the drill-spindle for any purpose, the pin *m* and set-screw *u* are removed, the bar *i* is turned to one side, and the said spindle is drawn upward out of its bearings and out of the pulley D.

What I claim as new, and desire to secure by Letters Patent, is—

1. The fixed feed-screw E, the hand-wheel F, containing the nut *x*, and the arms *i*, *a*, and *b*, in combination with the drill-spindle and frame B of the machine, all arranged substantially as herein specified.

2. The combination of the frame *f f*, the drill-spindle C, the pulley D, and rod *d*, substantially as and for the purpose herein set forth.

FRIEDRICH SHALLER.

Witnesses:
R. E. ANDREWS,
JNO. B. LONGLEY.